United States Patent [19]
Farber et al.

[11] Patent Number: 5,969,834
[45] Date of Patent: Oct. 19, 1999

[54] METHOD AND APPARATUS FOR MONITORING WAVELENGTH MULTIPLEXED OPTICAL SIGNALS

[75] Inventors: Gennady I. Farber, Palo Alto; Salim N. Jabr, Mountain View; Edward A. Vetter, Santa Clara; Victor A. Zeyliger, Milpitas, all of Calif.

[73] Assignee: Ditech Corporation, Sunnyvale, Calif.

[21] Appl. No.: 08/922,295

[22] Filed: Sep. 3, 1997

[51] Int. Cl.$^6$ ..................................................... H04B 10/08
[52] U.S. Cl. ........................ 359/110; 359/130; 356/328; 324/614; 455/226.3
[58] Field of Search .................................... 319/110, 130, 319/169–170, 177; 316/305, 328, 352, 354; 324/614; 415/226.3

[56] References Cited

U.S. PATENT DOCUMENTS

| | | | |
|---|---|---|---|
| 5,696,707 | 12/1997 | Hentschel et al. | 359/110 |
| 5,796,479 | 8/1998 | Derickson et al. | 356/328 |
| 5,825,521 | 10/1998 | Ogawa et al. | 359/110 |

OTHER PUBLICATIONS

Description and Specifications of the HP 71450, HP Lightwave Test and Measurement Catalog, 1997, pp. 54–60.

*Primary Examiner*—Kinfe-Michael Negash
*Attorney, Agent, or Firm*—Flehr Hohbach Test Albritton & Herbert

[57] ABSTRACT

One method of determining the signal to noise ratio of an optical signal models the noise floor based on amplified spontaneous emission (ASE) which is accumulated along the link. The ASE wavelength dependence is represented by a known mathematical function with a limited number of parameters. The parameters of this function are derived from measurements of the noise floor at a limited number of points by computational best fit means. A number of fiber grating filters at wavelengths between ITU allocated wavelengths are used to sample the optical noise and reflect the light back. An optical circulator is used to direct the reflected ASE light to an optical switch which allows the detector to select between transmitted and reflected light. The signal transmitted through the switch is monitored by a scanning filter with the appropriate resolution to resolve the signal or noise peaks. A first scan of the transmitted peaks is carried out and the signal is digitized and stored. A second scan of the reflected noise is carried out and digitized. A microcomputer computes the peak values and wavelengths, calibrates the wavelength scale from the known grating wavelengths, recomputes the ASE shape and the SNR, and communicates the results to outside agents when queried.

24 Claims, 8 Drawing Sheets

METHOD AND APPARATUS FOR MONITORING WAVELENGTH MULTIPLEXED OPTICAL SIGNALS

This invention relates to fiber optic communications systems; more specifically, it relates to the monitoring of the optical signal and noise status in wavelength multiplexed fiber optic transmission systems.

BACKGROUND OF THE INVENTION

In optical dense wavelength division multiplexed (DWDM) systems, such as long distance telecommunication links, it is important to monitor the signal to noise ratio (SNR) for a number of reasons pertaining to the overall performance of the telecommunication links.

The optical signal in these systems is a composite of several wavelengths, determined by International Telecommunications Union (ITU) standards. Each wavelength carries data at a high data rate. Signals weaken as they propagate through long distance optical fibers. To maintain the integrity of the signals, optical amplifiers are placed along the fibers to restore the signal levels. The optical amplifiers add random optical noise to the signal due to the amplified spontaneous emission (ASE) that naturally occurs within these amplifiers. When the light arrives at a receiving site, it is first de-multiplexed, i.e., the wavelength carriers are channeled to different receivers by an optical demultiplexer. Some ASE necessarily falls on the receivers causing errors to occur in the data transmission. As an example, an SNR of 20 dB may be required at a data rate of 2.5 Gb/s to achieve an error rate of one error every $10^{15}$ bits or a bit error rate (BER) of $10^{-15}$. The optical SNR has been used as a predictor of the BER, which is an indicator of the quality of an optical transmission channel.

The small spacing of adjacent optical wavelengths, 0.8 nm, combined with the large required SNR, over 20 dB, make it difficult to measure SNR in a fast and reliable manner. SNR measurements can be made using optical spectrum analyzers, like the Hewlett-Packard HP 71450. In this instrument, high optical resolution is achieved by use of a double monochromator. Large dynamic range is provided by using different optical detectors to observe high power and low power signals. The sensitivity of the HP device can also be increased by changing the scanning speed over wavelength. In real monitoring environments, however, the timing for SNR evaluation and decision making is limited to a few milliseconds. In conventional spectrum analyzers, high resolution and sensitivity can be achieved only by compromising measurement speed.

Another approach to high resolution and sensitivity is possible through the use of tunable optical filters like Fabry-Perot tunable filters. These devices consist of a pair of parallel mirrors with variable spacing which transmit light resonantly when the spacing is equal to an integer multiple of the wavelength. Fabry-Perot filters with high resolution are limited in free spectral range. Another problem with Fabry-Perot filters is their periodic resonance which makes it difficult to uniquely determine the wavelength of the system especially in the presence of multiple wavelengths.

It follows that a need exists for an SNR monitor capable of resolving ITU wavelengths and measuring the ASE at levels more than 20 dB below the signal level.

SUMMARY OF THE INVENTION

The present invention provides a method and apparatus for monitoring the signal to noise ratio of optical signals. In one embodiment, the method models the noise floor based on amplified spontaneous emission (ASE) which is accumulated along the link. The ASE wavelength dependence is represented by a known mathematical function with a limited number of parameters. The parameters of this function are derived from measurements of the noise floor at a limited number of points by computational best fit means.

A number of fiber grating filters at wavelengths between ITU allocated wavelengths are used to sample the optical noise and reflect the light back. An optical circulator is used to direct the reflected ASE light to an optical switch which allows the detector to select between transmitted and reflected light. The signal transmitted through the switch is monitored by a scanning filter with the appropriate resolution to resolve the signal or noise peaks. A first scan of the transmitted peaks is carried out and the signal is digitized and stored. A second scan of the reflected noise is carried out and the signal is digitized and stored. A microcomputer computes the peak values and wavelengths, calibrates the wavelength scale from the known grating wavelengths, recomputes the ASE shape and the SNR, and communicates the results to outside agents when queried.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
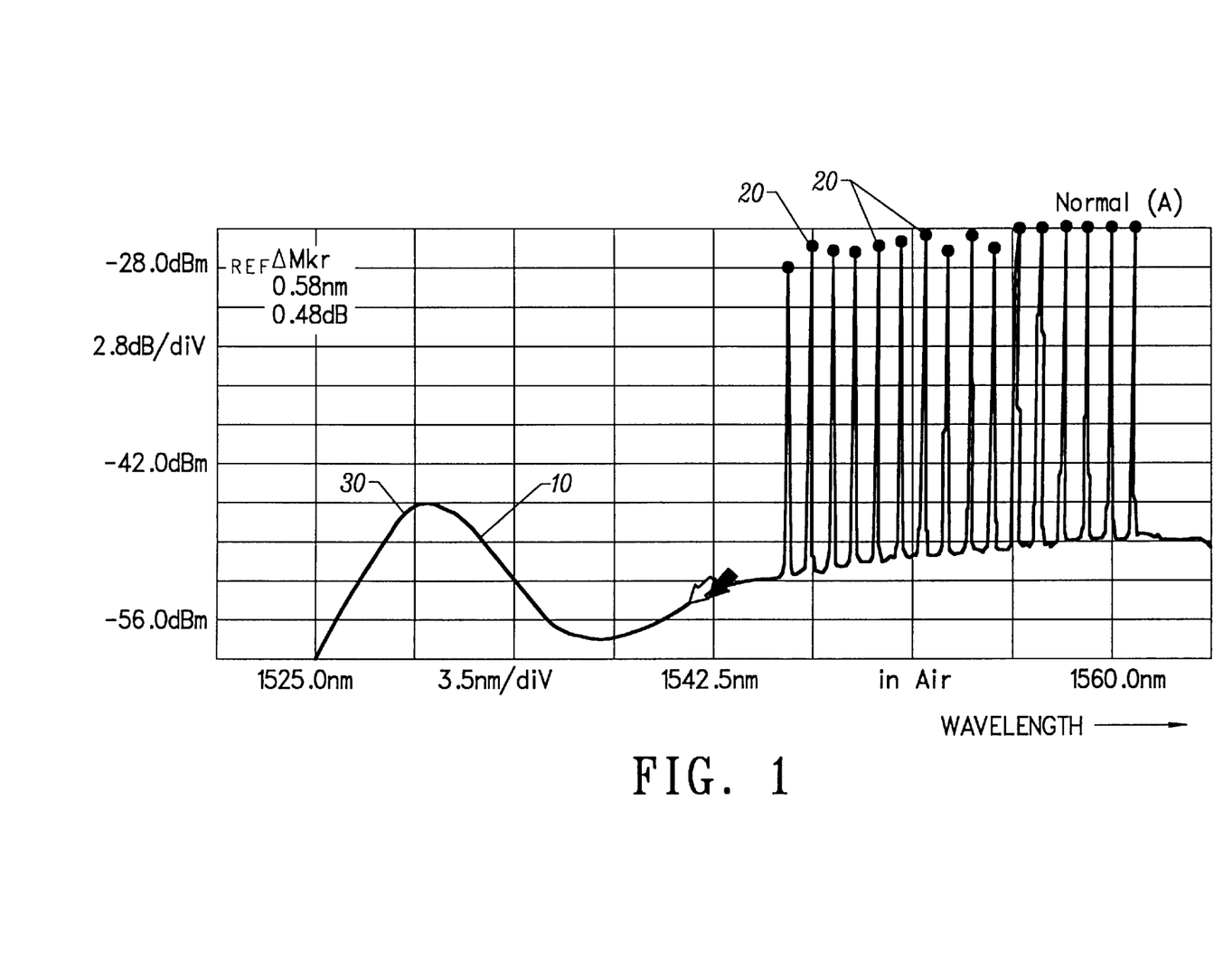
FIG. 1 illustrates a graph of a wavelength multiplexed optical signal with noise to be resolved by the WDM signal monitor.

Referring to FIG. 1, there is shown a graph of the power versus wavelength of an optical signal as it enters the WDM monitor. This full signal is comprised of a characteristic amplified spontaneous emission component 10, referred to hereafter as ASE, and a comb of optical signals 20. The ASE from Erbium doped fiber amplifiers has a characteristic hump 30, in the 1530 nm wavelength range. The optical signals in this particular case are located in the 1540–1560 nm range with a separation of 0.8 nm.

In one embodiment of the present invention method of calculating the SNR, the peaks of all the optical signals 20 are measured. The ASE 10 is measured only at a small number of points. The measurement of the noise floor is achieved by positioning reflective filters in the transmitting fiber at a few chosen wavelengths. The noise in optical amplifiers is typically caused by a continuous accumulation of ASE. Due to the nature of the amplification process the shape of the noise in the logarithmic scale can be quite accurately represented by a few Gaussian curves. Study of the shape of the noise floor for different types of Erbium fibers shows that three Gaussian curves are sufficient to represent the noise floor. These curves in turn are specified by three parameters each: the amplitude of the curve, its center wavelength and its width. The following equations represent the Gaussians and their sum:

1. $\text{Gaussian} = u1 * \exp\left[-\left(\frac{\lambda - u2}{u3}\right)^2 * 4 * \ln(2)\right]$ 2. $\text{NoiseFloor}_{dB} = \sum_{i+1}^{3} u1_i * \exp\left[-\left(\frac{\lambda - u2_i}{u3_i}\right)^2 * 4 * \ln(2)\right].$ In the formulas above, $\lambda$ is the wavelength, u1 is the amplitude parameter, u2 the center wavelength and u3 the width parameter. Summation from i=1 to 3 means that only three Gaussian curves are involved. Therefore, the mathematical function representing the noise depends on nine parameters. Accordingly, to simulate the noise floor based on the measurements in the limited number of points at least nine measurements are needed. In order to use curve fitting procedures, ten measurements are required. Some of the parameters can be pre-determined empirically, such as the u2 parameter which stands for the center wavelength of each Gaussian. As an example, in the case of Erbium doped amplifiers, Gaussians with center wavelengths at 1533 nm, 1547 nm and 1556 nm are used. Eliminating three parameters out of the set of nine reduces the number of noise measurements that need to be made.

Figure 2:
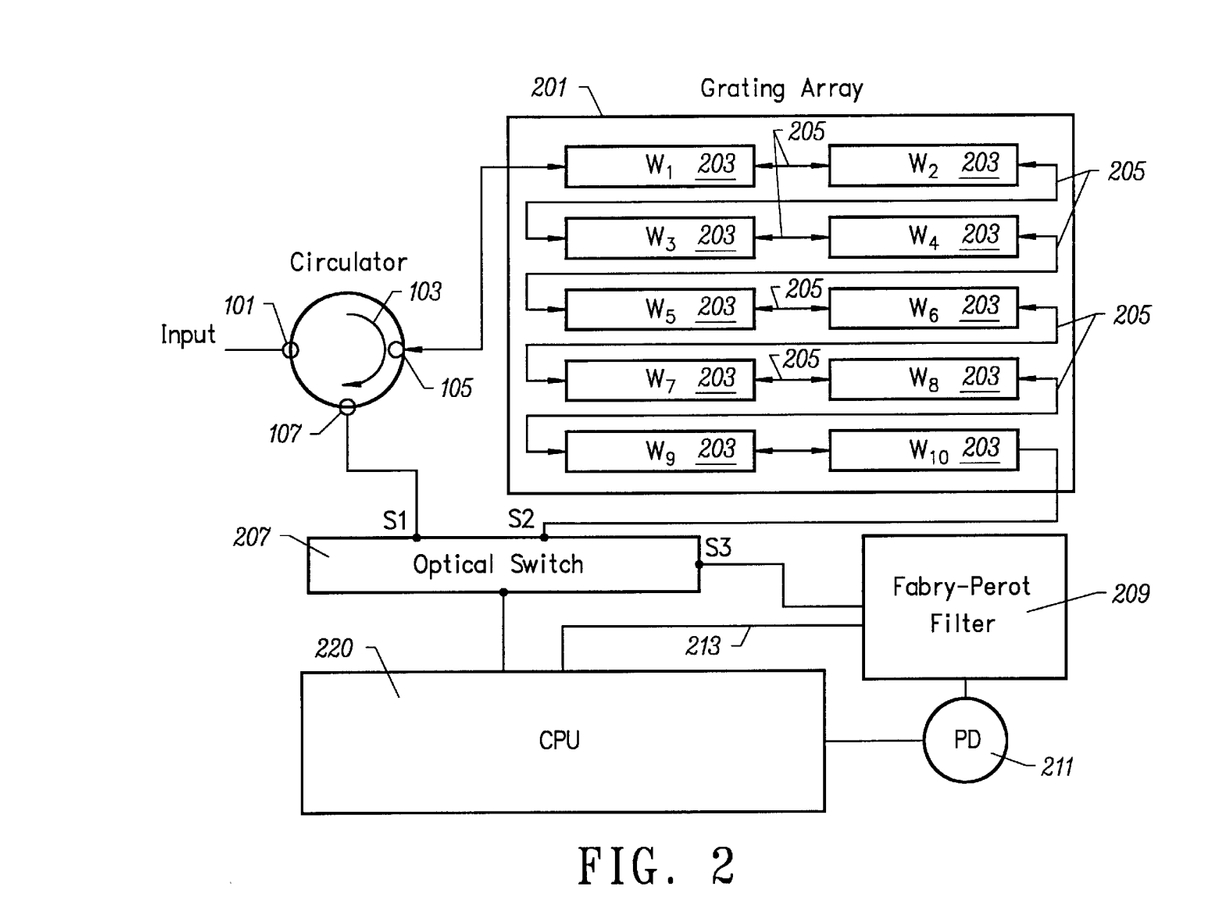
FIG. 2 illustrates a block diagram of a signal to noise monitoring system according to one embodiment of the present invention.

Referring to FIG. 2 there is shown a block diagram of a signal to noise monitoring system according to one embodiment of the present invention. An optical signal is fed into an input port of a three port optical channeling device. In FIG. 2, the optical channeling device comprises an optical circulator 103. Three port optical circulator 103 is a directional device where the light fed into input port 101 is channeled to port 105, the light fed into port 105 is channeled to port 107 and the light fed into port 107 is blocked.

The output of port 105 of the circulator is coupled to a grating array 201. Grating array 201 is comprised of a plurality of wavelength specific reflectors 203 which are connected in series by fibers 205. In one embodiment, the wavelength specific reflectors 203 comprise narrow band high reflectivity fiber Bragg grating filters. The grating filter peak wavelengths are chosen so that they fall exactly in between the optical signal wavelengths which are present in the WDM signal. This choice is made possible by the standardization of the signal wavelengths according to the International Telecommunication Union (ITU). The number of grating filters used depends on the desired accuracy of the SNR monitor. The light reflected by the gratings 203 goes back to the circulator 103 port 105 and comes out of port 107. The light signal coming out of port 107 goes through an optical switch 207 to a tunable filter 209. In one embodiment tunable filter 209 comprises a Fabry-Perot type of interferometer well known in the art. Fabry-Perot filters consist of two parallel high reflectivity mirrors separated by a controlled distance. The transmission of the Fabry-Perot interferometer is high when the distance between the mirrors is an integral multiple of the light wavelength. By scanning the distance between the mirrors the Fabry-Perot interferometer acts like a scanning filter. The distance between the mirrors is electrically controlled by means of a piezo electric or other actuator through an electrical wire 213. In one embodiment, a Fabry-Perot filter with a tunable frequency range of 1520–1560 nm is used.

Figure 3:
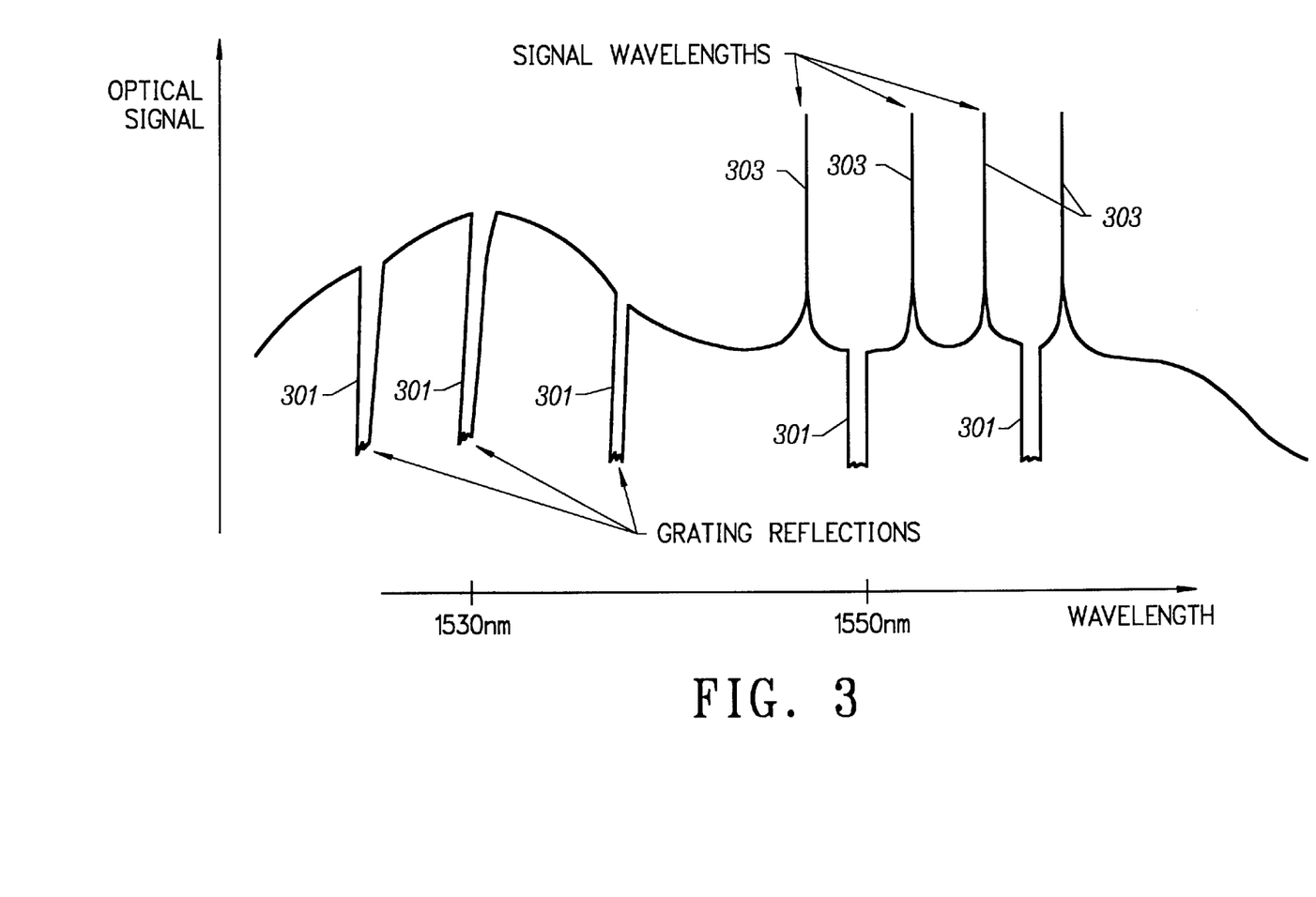
FIG. 3 illustrates a graphical representation of an optical signal transmitted through a series of reflective grating filters.

Referring to FIG. 3, there is shown a graph of a full signal after going through grating array 201 and arriving at the output of the last grating. There are "holes" 301 at the locations along the wavelength axis associated with the grating filters 203. The peaks 303 are at the signal wavelengths. Grating array 201 is practically transparent to the optical signals 20, which arrive at the output of the last grating undisturbed.

Figure 4:
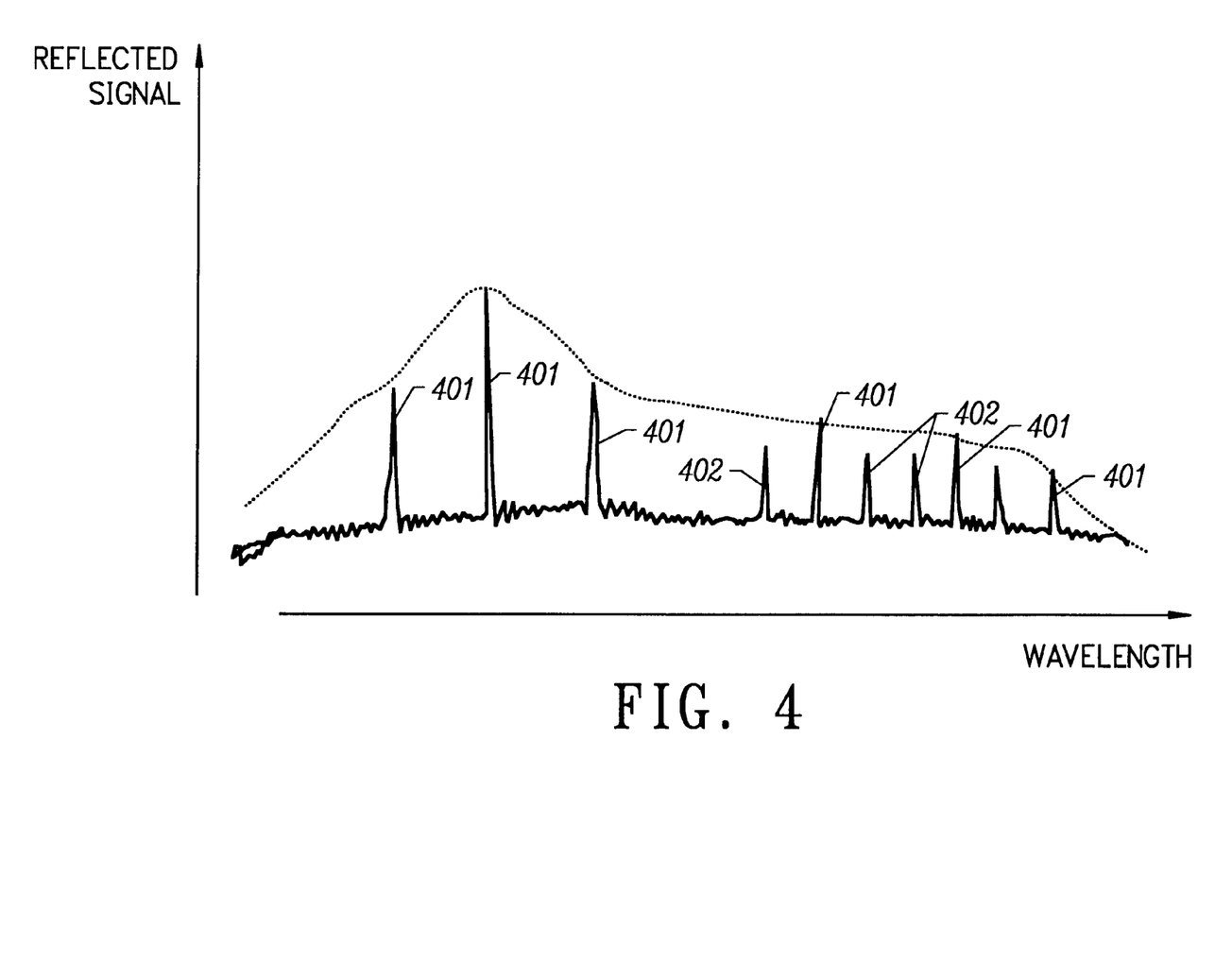
FIG. 4 is a graphical representation of an optical signal reflected by the gratings.

Referring to FIG. 4, there is shown a graph of the reflected signal over wavelength. There are peaks 401 corresponding to reflected ASE and peaks 402 corresponding to reflected signal wavelengths.

The optical switch 207, illustrated in FIG. 2, has three optical ports: S1, S2, and S3. Switch 207 can be electrically controlled to direct a signal from port S1 or from port S2 to port S3. Circulator port 107 is connected to port S1 of optical switch 207. The output of grating array 201 is connected to port S2 of the switch. Accordingly, depending on the switch position, the optical signal arriving at the output port S3 of the switch is either the light transmitted through the gratings or the light reflected by the gratings. The switch output is fed into the tunable Fabry-Perot (FP) filter 209. The FP filter 209 can be tuned to any wavelength within its tuning range by the voltage applied to its electrical port 213. Applying a linear ramp voltage enables FP filter 209 to scan the necessary wavelength range. The resolution of the FP filter is determined by the quality of its mirrors and should be sufficient to resolve the peaks of the signals arriving at its input port. The output of the FP filter goes to a processing device to analyze the output signals and compute a signal to noise ratio. For example, in the system illustrated in FIG. 2, the output of FP filter 209 is coupled to photodetector 211 and is further digitized for processing in a central processing unit (CPU) or controller 220.

Figure 6:
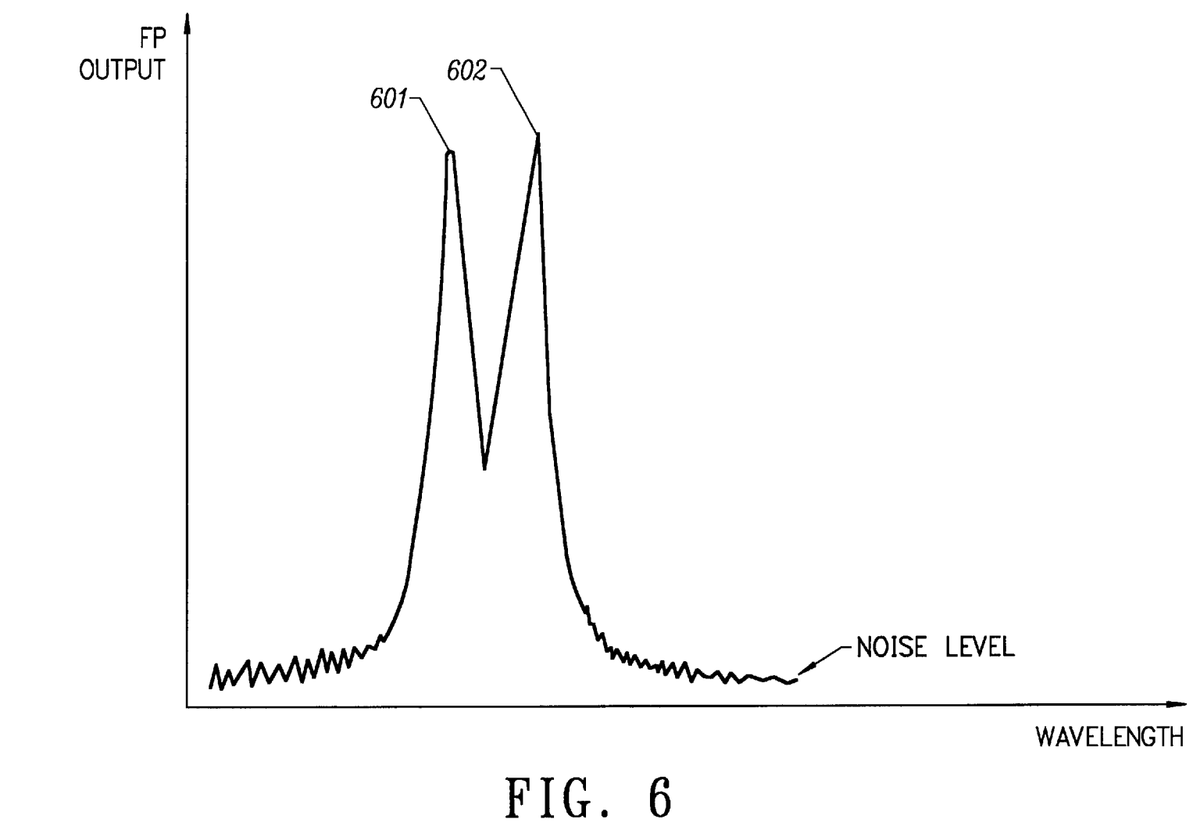
FIG. 6 is a graph of the output of a Fabry-Perot filter in the case where two signals are close in wavelength.

The FP filter spectral output is a convolution of the incoming signal with the FP filter transmission curve. The state of the art FP filters available, however, do not have enough resolution meaning that when two wavelength peaks are very close to each other, the output of the FP filter in between the peaks does not go down to the true noise level. Referring to FIG. 6 there is shown an output from an FP filter in the case where two wavelength signals 601 and 602 are close together. Therefore, in the present invention we use the FP filter to measure only the peaks of the transmitted and reflected signals. The photodetector 211 transforms the optical signal into an electrical signal. The electrical signal is further processed by the controller 220.

Figure 5:
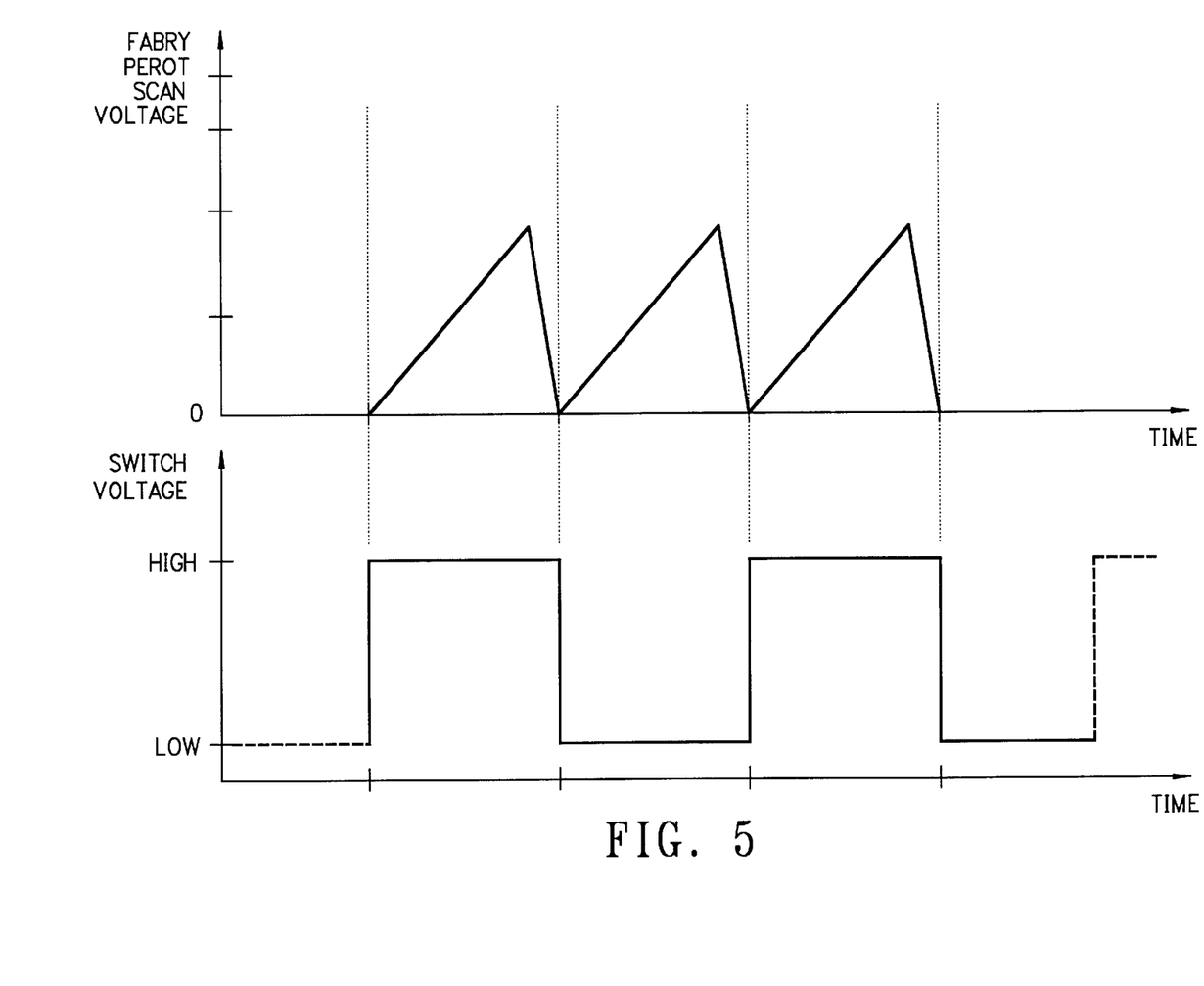
FIG. 5 is a graph of the voltages applied to the Fabry-Perot filter and to the switch as a function of time.

Controller 220 controls the operation of the present invention SNR monitoring system. Controller 220 provides a switching voltage to optical switch 207. Controller 220 also provides a linear ramp voltage to FP filter 209. This voltage is synchronized with the switching voltage. Referring to FIG. 5, there is shown the voltages applied to FP filter 209 and to optical switch 207 as a function of time. A further function of controller 220 is to process the electrical output signal from photodetector 211.

The processing of the electrical signal in turn is divided into the following stages. First, the electrical signals arriving at the controller 220 are sampled at the sampling rate, defined by the desired wavelength accuracy, e.g. for the range 1520 to 1560 nm and the accuracy of 0.02 nm the number of samples within one scan should be 4000. The result of sampling is sorted according to the optical switch position as "data" or as "noise." Then the data and noise arrays are calibrated for wavelength and amplitude.

The wavelength calibration of the apparatus is conducted under the presumptions that the tuning characteristic of the tuning filter is linear and described by the formula:

$$\lambda_{out} = \alpha * \text{Voltage} + \lambda_o$$

where $\lambda_{out}$ is the tuning filter center wavelength, $\lambda_o$ is the starting wavelength, and $\alpha$ is the curve parameter. During each scan the tuning voltage is sampled at the same moment as the signal arriving at the photodetector output. Accordingly, the arrays, formed during each scan, consists of two rows, one representing the sample number, and another representing the actual data.

The transmitted signal, as shown on FIG. 3, consists of "holes" 301 associated with the grating filters 201. Therefore the "data" array formed by the controller consists of the number of minimums in the data row linked to the sample number. This sample number in turn is associated with the grating wavelength. For example, for the range from 1520 to 1560 nm, 2000 samples are performed for each scan. The "data" array consists of minimums at sample numbers N1, N2, N3, N4, N5, . . . related to the set of gratings at the wavelengths W1, W2, W3, W4, W5, . . . The wavelength calibration is conducted according to the formula:

$$\text{Wavelength}(N) = W1 + (N-N1)*(W5-W3)/(N5-N3)$$

Few scans are conducted, calibrated and averaged over a period of time. When sufficient data is accumulated, the controller performs the following mathematical procedures:

1. The controller carries initial information about the system, which includes the wavelength of each optical channel and the wavelengths of the reflective grating filters used for noise floor measurements.
2. The controller samples the tuning voltage, the "data" signal and the "noise" signal. The controller forms the "data" and "noise" arrays, each consisting of two rows, one of which is the sample number.
3. The "data" array and the "noise" array are analyzed to find the maxima and minima. The maxima of the "data" array and the associated sample numbers are stored in a new array which is now representative of the optical power of the actual optical signals. The maxima of the "noise" array and the associated sample numbers are representative of the noise floor power at the grating wavelengths. For clarity the signal maxima array is hereafter referred to as the signal, and the noise maxima array as the noise.
4. The wavelength scale, being proportional to the voltage applied to the FP piezo actuator, is calibrated by noting the location of the minimums in the transmitted signal. The following calibration formula is used:

$$\text{Wavelength}(N) = W1 + (N-N1)*(W5-W3)/(N5-N3)$$

5. The noise array, consisting of a limited number of elements, such as ten, is utilized as an input to a curve fitting procedure, such as a least squares fitting procedure as described above. The output of the procedure is the noise level at any wavelength of interest.
6. The SNR is calculated as the ratio of the signal array data and the restored noise floor at the signal wavelength.
7. Alarm flags are generated in the memory and communicated over a serial transmission port if one or more signals is not at the proper ITU wavelength or if its amplitude is low or if the SNR is below a set threshold.

Figure 7:
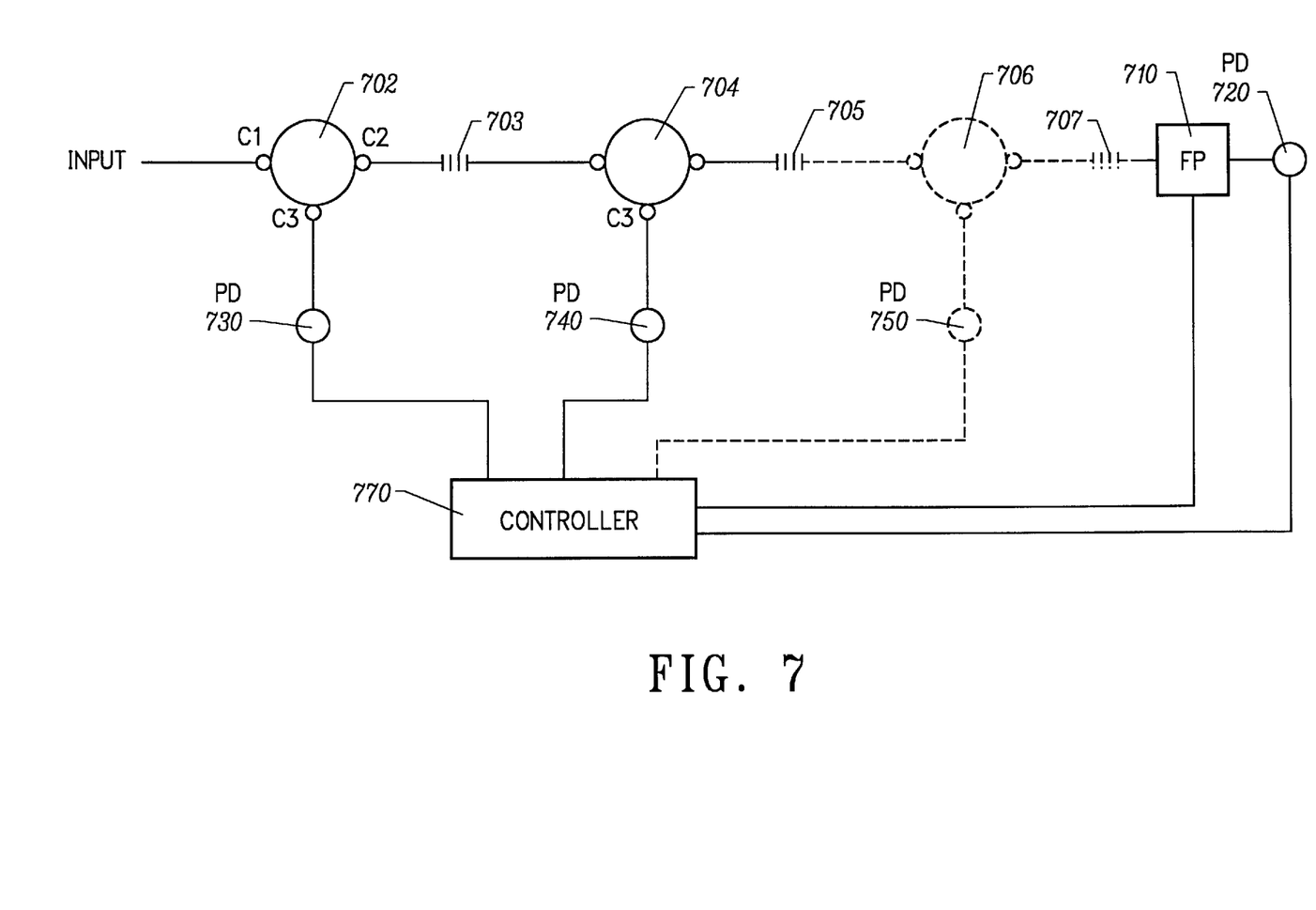
FIG. 7 is a block diagram of a signal to noise monitoring system according to a further embodiment of the present invention.

Referring to FIG. 7, there is shown a signal to noise monitoring system according to a further embodiment of the present invention wherein the optical switch is eliminated. Light enters into port C1 of a first circulator 702 and goes to a first grating reflector 703 followed by a second circulator 704 followed by a second grating reflector 705. Each grouping of a circulator, grating and photodetector comprises a wavelength reflection stage. A plurality of wavelength reflection stages are thus arranged in series. The transmitted light then enters FP filter 710 and from there goes to the photodetector 720. The light reflected from the first grating 703 is channeled back to the first circulator 702 port C3 and from there to a second photodetector 730. The light reflected from the second grating 705 goes to port C3 of the second circulator 704 and to a third photodetector 740. In this fashion a separate photodetector is dedicated to the light reflected at each grating wavelength. The electrical outputs of the photodetectors 730, 740 and 750 are digitized and processed in controller 770. Controller 770 performs the same functions as controller 220 with the exception of the switch control.

Figure 8:
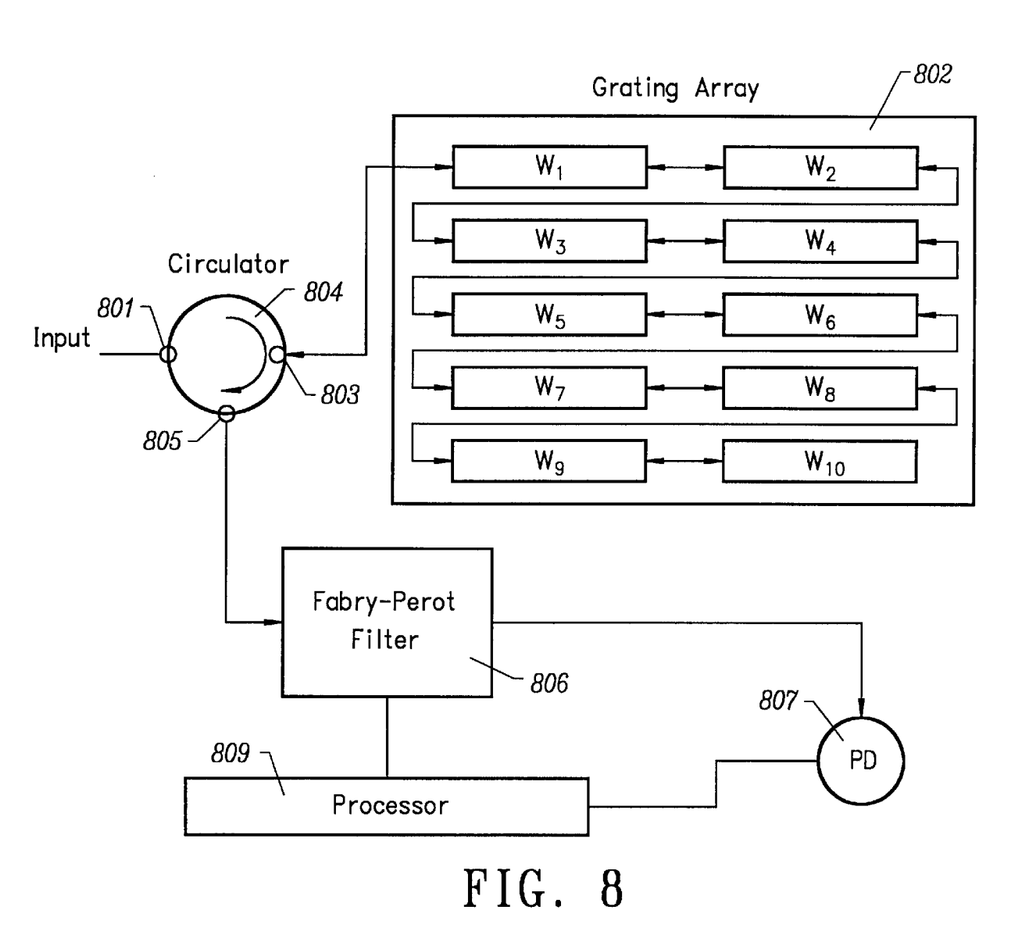
FIG. 8 is a block diagram of a signal wavelength and ASE monitoring system according to another embodiment of the present invention.

Referring to FIG. 8, there is shown a third embodiment of the present invention where only the light reflected from the grating array 802 is measured. In this embodiment light enters into port 801 of circulator 804 and exits at port 803. The light then is coupled to grating array 802. The reflected light from grating array 802 re-enters circulator 804 at port 803 and exits at port 805. From circulator 804, the light goes to FP filter 805 and then to photodetector 807. The output of photodetector 807 goes to processor 809 where it is digitized and processed in a manner similar to the procedure described in the first embodiment with the exception that the same scan yields data on the signal wavelengths as well as on the ASE. In this embodiment, use is made of the fact that the gratings positioned at wavelengths between ITU wavelengths still have non-zero reflectivity at the ITU wavelengths. This causes the signal wavelengths to be reflected, but with much reduced amplitudes, while the ASE is reflected with almost no attenuation. The reflectivity of the grating array 802 is measured at the ITU wavelength in an initial calibration measurement. The calibration data is stored in processor 809 and later used to recompute the amplitude of the reflected signals. A reflected signal is shown in FIG. 4. A scan of the FP filter yields signal data and the maxima of the signal data are then determined.

In the wavelength calibration process of the FIG. 8 embodiment the signal arriving at the output of photodetector 807 is illustrated in FIG. 4. The FP filter utilized in this embodiment is characterized in advance with respect to the linearity of its tuning curve, hence $\alpha$ is known. The set of grating wavelengths is picked in such a fashion that the first peak is always an ASE peak, thus W1 is known. Accordingly, the formula for wavelength calibration is:

$$\text{Wavelength}(N) = W1 + \alpha*(\text{Voltage}(N) - \text{Voltage}(N1))$$

where N1 is the sample number associated with the first peak in the array.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of monitoring the signal to noise ratio for optical signals comprising the steps of:
   (a) measuring the peaks of the optical signals;
   (b) measuring the noise floor at a predetermined number of points along the wavelength axis;
   (c) reconstructing the noise floor;
   (d) computing the signal to noise ratio using the measured signal level and the reconstructed noise floor.

2. The method of claim 1 wherein step (a) further comprises measuring the peaks of optical signals of known wavelengths in a telecommunications link.

3. The method of claim 1 wherein step (d) further comprises reconstructing the noise floor using a sum of three Gaussian curves, wherein each Gaussian curve is defined using an amplitude factor, a center wavelength and a width.

4. The method of claim 3 wherein predetermined values are used for at least one parameter of the Gaussian curves.

5. The method of claim 3 wherein step (b) further comprises positioning wavelength specific reflectors in the optical signal path at a plurality of wavelengths.

6. The method of claim 5 wherein step (b) further comprises measuring only the peaks of signals transmitted through the wavelength specific reflectors and the peaks of signals reflected from the wavelength specific reflectors.

7. The method of claim 6 wherein step (b) further comprises measuring optical signals reflected from the wavelength specific reflectors using a Fabry-Perot tunable filter.

8. The method of claim 2 further comprising the steps of:
   setting an alarm flag when the signal to noise ratio falls below a predetermined level; and
   setting an alarm flag when a signal wavelength is not within one of a predetermined number of signal wavelength ranges.

9. The method of claim 6 further comprising the step of calibrating a wavelength scale using the wavelengths of the wavelength specific reflectors.

10. An apparatus for monitoring the signal to noise ratio of optical signals comprising:
    an optical channeling device having a first, a second and a third port, wherein said optical channeling device couples optical signals from said first port to said second port and couples optical signals from said second port to said third port;
    a reflector array having an input port and an output port, said reflector array comprising at least one wavelength specific reflector coupled in series between said reflector array input port and said reflector array output port, said reflector array input port coupled to said optical channeling device second port;
    a tunable filter having an input port and an output port;
    an optical switch having a first, a second and a third port, said optical switch first port coupled to said optical channeling device third port, said optical switch second port coupled to said reflector array output port, said optical switch third port coupled to said tunable filter input port;
    a processing device, said processing device coupled to said tunable filter output port, wherein said processing device provides control signals, determines the amplitude of signals and computes a signal to noise ratio.

11. The apparatus of claim 10 wherein said optical switch further has a control terminal, and said tunable filter further has a control terminal; and
    wherein said processing device comprises:
    a photodetector having an input port and an output port, said photodetector input port coupled to said tunable filter output port;
    a controller having an input terminal, a first control terminal and a second control terminal, said controller input terminal coupled to said photodetector output port, said controller first control terminal coupled to said optical switch control terminal, said controller second control terminal coupled to said tunable filter control terminal.

12. The apparatus of claim 11 wherein the wavelengths of said wavelength specific reflectors are defined using predetermined wavelengths of optical signals in an optical telecommunication link.

13. The apparatus of claim 12 wherein said wavelength specific reflector comprises a fiber Bragg grating.

14. The apparatus of claim 13 wherein said tunable filter comprises a Fabry-Perot tunable filter.

15. An apparatus for monitoring the signal to noise ratio of optical signals comprising:
    a tunable filter having an input port and an output port;
    a final photodetector having an input port and an output port, said final photodetector input port coupled to said tunable filter output port;
    a controller having a plurality of input ports;
    a plurality of wavelength reflection stages, each having an input port, a transmission port, and a reflection port, said wavelength reflection stages each comprising:
    an optical channeling device having a first, a second and a third port, wherein said optical channeling device couples optical signals from said first port to said second port and couples optical signals from said second port to said third port, said optical channeling device first port coupled to said wavelength reflection stage input port;
    a wavelength specific reflector, said wavelength specific reflector coupled in series between said optical channeling device second port and said wavelength reflection stage transmission port; and
    a photodetector having an input port and an output port, said photodetector input port coupled to said optical channeling device third port, said photodetector output port coupled to said wavelength reflection stage reflection port;
    wherein adjacent wavelength reflection stages are coupled such that said transmission port of a first wavelength reflection unit is coupled to said input port of a second wavelength reflection unit;
    said tunable filter input port coupled to said transmission port of the last wavelength reflection stage;
    each of said reflection ports of said plurality of wavelength reflection stages coupled to one of said controller input ports, said final photodetector output port coupled to one of said controller input ports.

16. The apparatus of claim 15 wherein the wavelengths of said wavelength specific reflectors are defined using predetermined wavelengths of optical signals in an optical telecommunication link.

17. The apparatus of claim 16 wherein said wavelength specific reflector comprises a fiber Bragg grating.

18. A method of monitoring the signal to noise ratio for optical signals comprising the steps of:

(a) calibrating a reflector array to determine the reflectivity of the reflector array for predetermined frequency signals;

(b) receiving an optical signal at a reflector array;

(c) measuring optical signals reflected from the reflector array;

(d) computing the amplitude of a predetermined frequency optical signal received at the grating array using a measured reflected predetermined frequency signal and a calibration factor generated in said calibrating step;

(e) measuring the noise floor by measuring peaks outside of a predetermined range of said predetermined frequency signals;

(f) reconstructing the noise floor;

(g) computing the signal to noise ratio using the computed signal amplitudes level and the reconstructed noise floor.

19. The method of claim 18 wherein step (b) further comprises receiving an optical signal from a telecommunication link.

20. The method of claim 19 wherein step (f) further comprises reconstructing the noise floor using a sum of three Gaussian curves, wherein each Gaussian curve is defined using an amplitude factor, a center wavelength and a width.

21. The method of claim 20 wherein predetermined values are used for at least one parameter of the Gaussian curves.

22. The method of claim 20 wherein step (e) further comprises positioning wavelength specific reflectors in the optical signal path at a plurality of wavelengths.

23. The method of claim 22 further comprising the step of calibrating a wavelength scale using the wavelengths of the wavelength specific reflectors.

24. An apparatus for monitoring the signal to noise ratio of optical signals comprising:

an optical channeling device, having a first, a second and a third port, wherein said optical channeling device couples optical signals from said first port to said second port and couples optical signals from said second port to said third port;

a reflector array having a port, said reflector array comprising at least one wavelength specific reflector coupled to said reflector array, said optical channeling device second port coupled to said reflector array port;

a tunable filter having an input port and an output port, said tunable filter input port coupled to said optical channeling device third port;

a processing device, said processing device coupled to said tunable filter output port, wherein said processing device provides a control signal, determines the amplitude of signals and computes a signal to noise ratio.

* * * * *